(12) United States Patent
Otsuka

(10) Patent No.: US 7,894,532 B2
(45) Date of Patent: Feb. 22, 2011

(54) VARIABLE-LENGTH ENCODING APPARATUS AND METHOD

(75) Inventor: Katsumi Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1485 days.

(21) Appl. No.: 11/288,855

(22) Filed: Nov. 29, 2005

(65) Prior Publication Data

US 2006/0115000 A1 Jun. 1, 2006

(30) Foreign Application Priority Data

Nov. 30, 2004 (JP) ............................. 2004-347238

(51) Int. Cl.
H04N 7/12 (2006.01)
H03M 7/40 (2006.01)

(52) U.S. Cl. ........................... 375/240.23; 375/240.24; 382/246; 341/67; 358/426.13

(58) Field of Classification Search ............ 375/240.12, 375/240.18, 240.2, 240.23, 240.24, 240.01, 375/240.26; 382/238, 244, 245, 246, 248, 382/250; 341/59, 65, 67; 358/1.15, 426.02, 358/426.04, 426.05, 426.06, 426.07, 426.13, 358/426.14, 426.15, 426.16
See application file for complete search history.

(56) References Cited

U.S. PATENT DOCUMENTS

| | | | | |
|---|---|---|---|---|
| 5,497,153 A | * | 3/1996 | Jeong | ........................... 341/67 |
| 5,699,474 A | * | 12/1997 | Suzuki et al. | ................. 386/68 |
| 6,167,091 A | | 12/2000 | Okada et al. | |
| 2003/0219164 A1 | | 11/2003 | Otsuka | |
| 2007/0253488 A1 | * | 11/2007 | Kitamura | ................ 375/240.16 |
| 2008/0307198 A1 | * | 12/2008 | Kataoka et al. | ................ 712/28 |

FOREIGN PATENT DOCUMENTS

| JP | 01116861 A | * | 5/1989 |
|---|---|---|---|
| JP | 11-136677 A | | 5/1999 |
| JP | 11-252549 | | 9/1999 |

OTHER PUBLICATIONS

The above references were cited in a Aug. 28, 2009, Japanese Office Action that issued in Japanese Patent Application No. 2004-347238, which is enclosed without English Translation.

* cited by examiner

*Primary Examiner*—Dov Popovici
(74) *Attorney, Agent, or Firm*—Cowan, Liebowitz & Latman, P.C.

(57) ABSTRACT

A variable-length encoding apparatus receives image data on a block basis, generates a plurality of syntax elements from the image data, and outputs an encoded stream by performing variable-length encoding of the syntax elements. This apparatus includes a block memory unit group including at least two block memory units which store image data on a block basis, generates at least one syntax element by reading out transformation coefficients from the block memory units, independently variable-length-encodes each of syntax elements and outputs variable-length codewords, includes a variable-length code memory unit group including at least two variable-length code memory units which independently store the variable-length codewords as codeword streams, and generates one encoded stream from the respective codeword streams supplied from the variable-length code memory unit group.

10 Claims, 11 Drawing Sheets

FIG. 4 *(PRIOR ART)*

| MSB | | | | LSB |
|---|---|---|---|---|
| coeff_Token | trailing_one_sign | Level | TotalZeros | run_before |

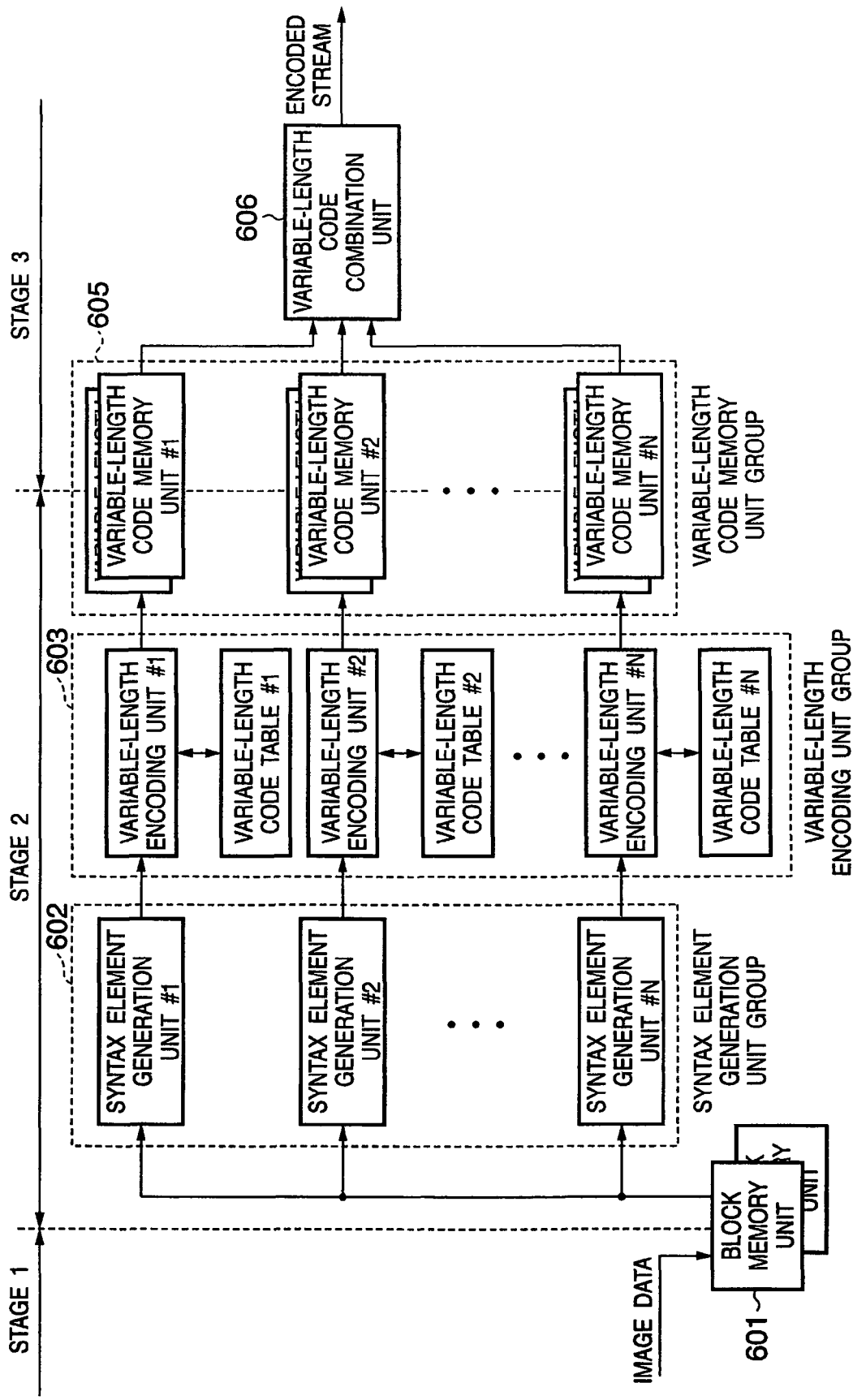

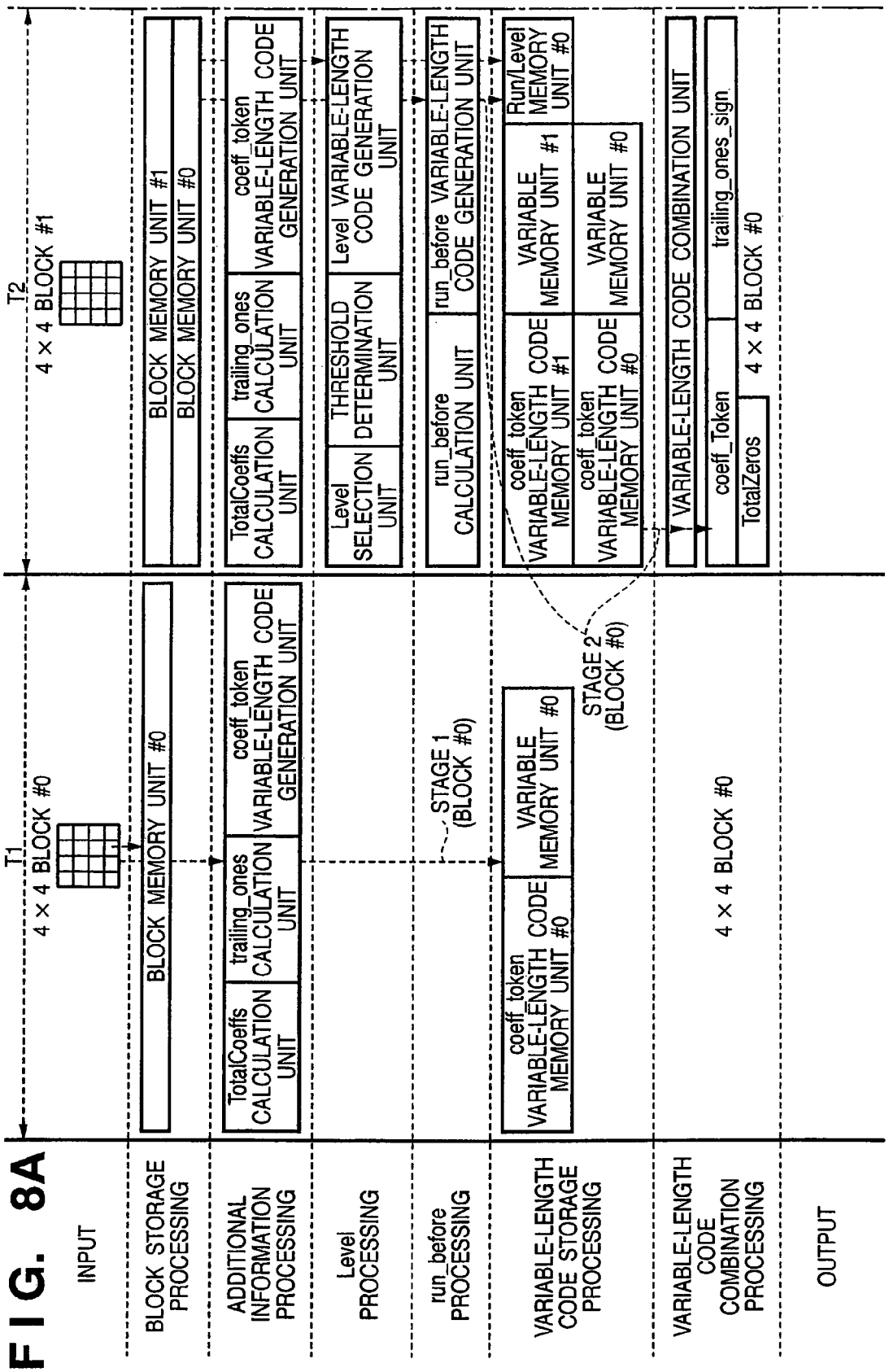

VARIABLE-LENGTH ENCODING APPARATUS AND METHOD

FIELD OF THE INVENTION

The present invention relates to a high-speed variable-length encoding apparatus for still images and moving images encoding processing.

BACKGROUND OF THE INVENTION

Conventionally, there is known a scheme using an entropy encoding technology based on run-length/category encoding and variable-length encoding as part of the compression encoding technology for still images and moving images. This technology is also used for international standards such as the JPEG (Joint Photographic Expert Group) encoding scheme and the MPEG-1/-2 (Moving Picture Experts Group) encoding scheme.

In an event subjected to variable-length encoding in these encoding schemes, entropy encoding is performed by assigning a Huffman code to a two dimensional event called a runlength and level. That is, in JPEG or MPEG-1/-2, an encoded stream can be generated by only performing variable-length encoding for this one type of two dimensional event. Note that in the following description, an event subjected to variable-length encoding (information defined to be transmitted in a predetermined syntax, such as a DCT coefficient or motion vector) will be referred to as a syntax element hereinafter. In this case, a syntax is a rule for a compressed/encoded data string.

In entropy encoding based on the H. 264 encoding scheme which has recently attracted a great deal of attention as a high-efficiency encoding scheme, the runlengths and levels of transformation coefficients must be encoded as independent syntax elements. In addition, five syntax elements must be variable-length-encoded for each block. The five syntax elements include the total number (TotalCoeffs) of significant coefficients in a 4×4 block, the number (trailing_ones) of coefficients whose final significant coefficients are the absolute value "1" in a zigzag scan order, syntax element coeff_token of a two dimensional event, TotalZeros representing the number of transformation coefficients whose values are zero, and trailing_ones_sign representing the sign of a coefficient code with final significant coefficient being the absolute value "1" in the zigzag scan order. FIG. 1 shows a comparison between a variable-length encoding apparatus based on the JPEG or MPEG-1/-2 encoding scheme and one based on the H. 264 encoding scheme.

In entropy encoding for the H. 264 encoding scheme, transformation coefficients after an orthogonal transformation or image data are processed on a 4×4 block basis. In the H. 264 encoding scheme, the above five syntax elements are generated and variable-length-encoded by performing processing in a reverse order (reverse scan order) to the zigzag scan order in the 4×4 block shown in FIG. 2A. Note that the value of each transformation coefficient in the block is expressed as Level [I] with I representing a zigzag scan number.

<Entropy Encoding Processing in H. 264 Encoding Scheme>

Entropy encoding processing of a 4×4 block comprising transformation coefficients shown in FIG. 2B by a CAVLC scheme based on the H. 264 encoding scheme will be described next. FIG. 3 is a block diagram of a variable-length encoding apparatus based on the H. 264 encoding scheme. FIG. 4 shows the order in which variable-length codes corresponding to five syntax elements on a 4×4 block basis are combined to form an encoded stream.

A TotalCoeffs calculation unit 304 calculates the number of transformation coefficients in the 4×4 block in FIG. 2B which are not value 0. In this case, TotalCoeffs=6. A TotalZeros calculation unit 306 calculates the number of transformation coefficients whose Level [I] value is 0 between Level [9] and Level [0] as final significant coefficients. In this case, TotalZeros=4. A trailing_ones calculation unit 305 calculates the number of transformation coefficients, up to three, whose absolute values are 1 from Level [9] as final significant coefficients. In this case, since Level [9] and Level [7] correspond to the absolute value 1, trailing_ones=2. Note that a coeff_token variable-length code generation unit 309 calculates coeff_token as a syntax element in a two dimensional event from the value of TotalCoeffs calculated by the TotalCoeffs calculation unit 304 and the value of trailing_ones calculated by the trailing_ones calculation unit 305.

Since values of "Level" as a syntax element are sequentially generated in the reverse scan order, values of "Level" are sequentially generated from Level [9] as a final significant coefficient. However, the values of "Level" need to be corrected in accordance with the value of trailing_ones calculated by the trailing_ones calculation unit 305. A Level selection unit 301 performs this process. The Level selection unit 301 sequentially outputs transformation coefficients whose values of Level [I] are not 0 to a threshold determination unit 302 and a Level variable-length code generation unit 303. If the value of trailing_ones is smaller than 3, 1 is subtracted from the absolute value of first Level [I] whose absolute value is not 1. In this case, since trailing_ones=2, the value "5" obtained by subtracting 1 from the absolute value "6" of Level [6] is output. In addition, the threshold determination unit 302 determines suffixLength and outputs it to the Level variable-length code generation unit 303.

SuffixLength is determined by comparing a threshold table predetermined according to the H. 264 specifications with the input value of Level [I]. The Level variable-length code generation unit 303 selects a variable-length table (not shown) to be used for variable-length encoding in accordance with the value of SuffixLength.

A run_before calculation unit 307 sequentially calculates zero runs in the reverse scan order. For example, run_before=1 between Level [9] and Level [7], and run_before=0 between Level [7] and Level [6]. Note that a zeros_left managing unit outputs values obtained by subtracting sequentially calculated values of run_before from the values of TotalZeros, as zeros_left, to a run_before variable-length code generation unit 311. The run_before variable-length code generation unit 311 generates a variable-length code from the values of run_before and zeros_left.

A variable-length code combination unit 312 sequentially combines a variable-length code input from the coeff_token variable-length code generation unit 309, trailing_ones_sign input from the trailing_ones calculation unit 305, a variable-length code input from the Level variable-length code generation unit 303, a variable-length code input from a TotalZeros variable-length code generation unit 310, and a variable-length code input from the run_before variable-length code generation unit 311 in accordance with the order shown in FIG. 4, and outputs the resultant data as an encoded stream corresponding to FIG. 2B.

<Processing by Prior Art>

A case wherein entropy encoding is performed in hardware will be described with reference to the block diagram of FIG.

3. FIG. 5A and FIG. 5B show the relationship between each entropy encoding process and time in accordance with the prior art.

As transformation coefficients which are inputs in the block diagram of FIG. 3, 16 transformation coefficients in a 4×4 block in a process 503 shown in FIG. 5A are sequentially input to a process 506 and a process 510 in the reverse scan order. In the process 506, syntax elements TotalCoeffs and trailing_ones are calculated in parallel, and the coefficient sign trailing_ones_sign corresponding to trailing_ones is calculated. When the calculation of syntax elements TotalCoeffs and trailing_ones is complete, a variable-length code corresponding to coeff_token is generated from the values of these two syntax elements.

The generated one variable-length code and one sign trailing_ones_sign are generated into an encoded stream comprising coeff_token and trailing_ones_sign by a variable-length code combination unit 515 as indicated by the process 515. In the process 510, syntax element TotalZeros and a corresponding variable-length code are generated in parallel with the process 506. However, the generated one variable-length code is not combined as an encoded stream by the variable-length code combination unit in the process 515, and is held as an output from the process 510 at this point of time.

In a process 511, a variable-length code with Level [I] is generated. As indicated by the process 504, the same transformation coefficients as those input in the process 503 are input to the process 511 again. In the process 511, variable-length codes corresponding to values Level [I] of transformation coefficients input from a process 504 are output to the variable-length code combination unit for the process 515 as needed in accordance with the values of trailing_ones calculated in the process 506. The variable-length code combination unit in the process 515 combines a maximum of 16 variable-length codes, as needed, to generate an encoded stream comprising coeff_token, trailing_ones_sign, and Level.

When input operation from the process 511 is complete, the variable-length code combination unit in the process 515 combines TotalZeros held as an output from the process 510 to generate an encoded stream comprising coeff_token, trailing_ones_sign, Level, and TotalZeros.

In a process 514, a variable-length code of run_before is generated. As indicated by a process 505, the same transformation coefficients as those in the process 503 are sequentially input as in the process 504. In the process 514, variable-length codes of run_before are generated as needed from the values of syntax element TotalZeros which have already been calculated in the process 510 and values of Level [I] of the input transformation coefficients and are output to the variable-length code combination unit in the process 515. The variable-length code combination unit in the process 515 combines the variable-length codes of run_before with the encoded stream comprising coeff_token, trailing_ones_sign, Level, and TotalZeros as needed to complete the generation of the encoded stream of the 4×4 block.

The same processing is repeatedly performed for all 4×4 blocks in a picture, thereby realizing entropy encoding.

For example, an image encoding/decoding apparatus has been proposed, in which pipeline processing is realized by dividing the respective processes constituting encoding processing into stages, and providing memories before and after the processing stages, thereby achieving an increase in processing speed (see Japanese Patent Application Laid-open No. 11-252549).

In the prior art, however, in order to process one 4×4 block, the transformation coefficients of a 4×4 block need to be input three times (a total of three input operations to the processes 503, 504, and 505 described above). This requires an enormous processing time, leading to difficulties in realizing real-time encoding.

It is also difficult to apply the above proposed technique to entropy encoding like processing of a plurality of syntax elements as one encoded stream.

SUMMARY OF THE INVENTION

According to one aspect of embodiments of the present invention, there is provided a variable-length encoding apparatus which receives image data on a block basis, generates syntax elements from the image data, and outputs an encoded stream by performing variable-length encoding of the syntax elements, comprising a block memory unit group including a plurality of block memory units which store the image data on a block basis, a syntax element generation unit group including a plurality of syntax element generation units which read out image data from the block memory units and generate syntax elements, a variable-length encoding unit group including a plurality of variable-length encoding units which independently variable-length-encode syntax elements input from the syntax element generation unit group and output variable-length codewords, a variable-length code memory unit group including a plurality of variable-length code memory units which independently store the variable-length codewords supplied from the variable-length encoding unit group as codeword streams, and a variable-length code combination unit which generates one encoded stream from a plurality of codeword streams supplied from the variable-length code memory unit group.

In addition, according to another aspect of embodiments of the present invention, there is provided a variable-length encoding method of receiving image data on a block basis, generating syntax elements from the image data, and outputting an encoded stream by performing variable-length encoding of the syntax elements, comprising storing the image data in a block memory unit group including a plurality of block memory units on a block basis, generating syntax elements in a plurality of syntax element generation units by reading out image data from the block memory units, independently variable-length-encoding the generated syntax elements for each syntax element in a plurality of variable-length encoding units and outputting a variable-length codewords, independently storing the output variable-length codewords as codeword streams in a plurality of variable-length code memory unit groups, and generating one encoded stream from the plurality of codeword streams supplied from the variable-length code memory units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the order of syntax elements in H. 264;

FIG. 6 is a view for explaining the basic concept of a variable-length encoding apparatus according to the present invention;

FIGS. 8A and 8B are views showing a processing sequence in the entropy encoding scheme according to the embodiment.

DETAILED DESCRIPTION OF THE PREFERRED EMBODIMENTS

Figure 1:
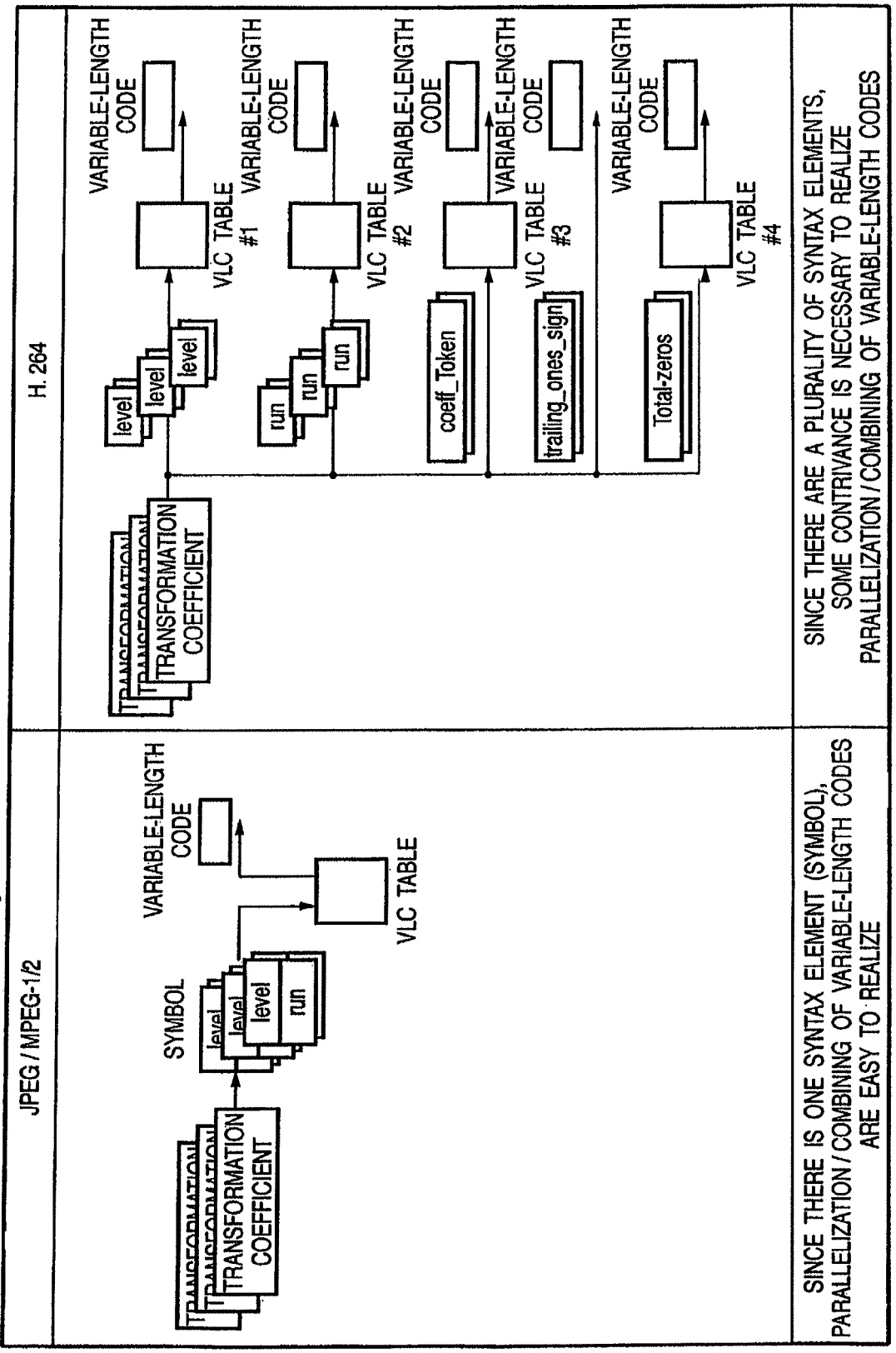
FIG. 1 is a view showing comparison between the H. 264 encoding scheme and another encoding scheme.

Preferred embodiments of the present invention will now be described in detail in accordance with the accompanying drawings.

<Basic Concept>

Image data are input to the input of a variable-length encoding apparatus shown in FIG. 6 on a block basis. The input image data are primarily stored in a block memory unit group 601 on a block basis. Each block memory unit 601 has a capacity large enough to store at least two blocks, and operates independently for each block-based capacity. One of a plurality of block-based memory units in the block memory unit group 601 is selected to sequentially write image data input on a block basis.

After write operation for one block is complete in the block memory unit group 601, image data are sequentially read out from the block memory unit group 601, and a plurality of syntax element generation units in a syntax element generation unit group 602 generate the respective syntax elements.

In addition, variable-length encoding is independently performed for each of the syntax elements to generate a variable-length code, and each variable-length code is independently stored in a variable-length code memory unit group 605.

In parallel with processing in the syntax element generation unit group and variable-length code generation unit group, a block memory unit from which no data has been read out to the syntax element generation unit group is selected from a plurality of block memory units in the block memory unit group 601, and the next image data are written in the selected memory unit on a block basis.

Furthermore, a variable-length code combination unit 606 combines variable-length codes corresponding to the respective syntax elements independently stored in the variable-length code memory unit group 605, and outputs one encoded stream.

Repeating these processes for all input image data on a block basis makes it possible to realize a variable-length encoding apparatus which performs pipeline operation on a block basis with the block memory unit group 601 and variable-length code memory unit group 605 serving as boundaries of stages. A variable-length encoding apparatus which is applied to the CAVLC scheme as an entropy encoding scheme in the H. 264 encoding scheme will be described next as a preferred embodiment of the present invention.

<Arrangement of Encoding Apparatus>

Figure 7A:
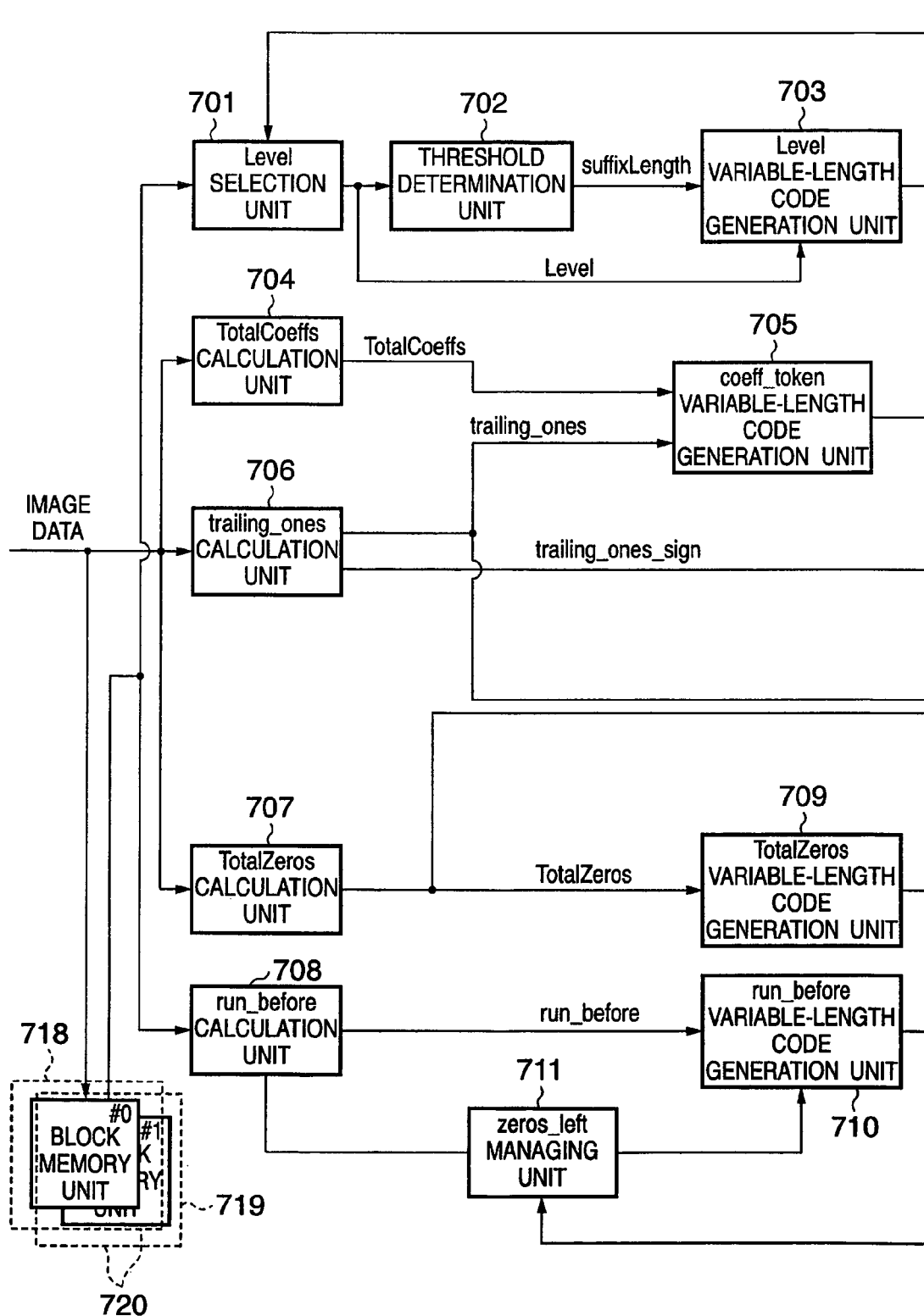
FIGS. 7A and 7B are block diagrams showing the arrangement of a variable-length encoding apparatus based on the entropy encoding scheme according to an embodiment.
Figure 7B:
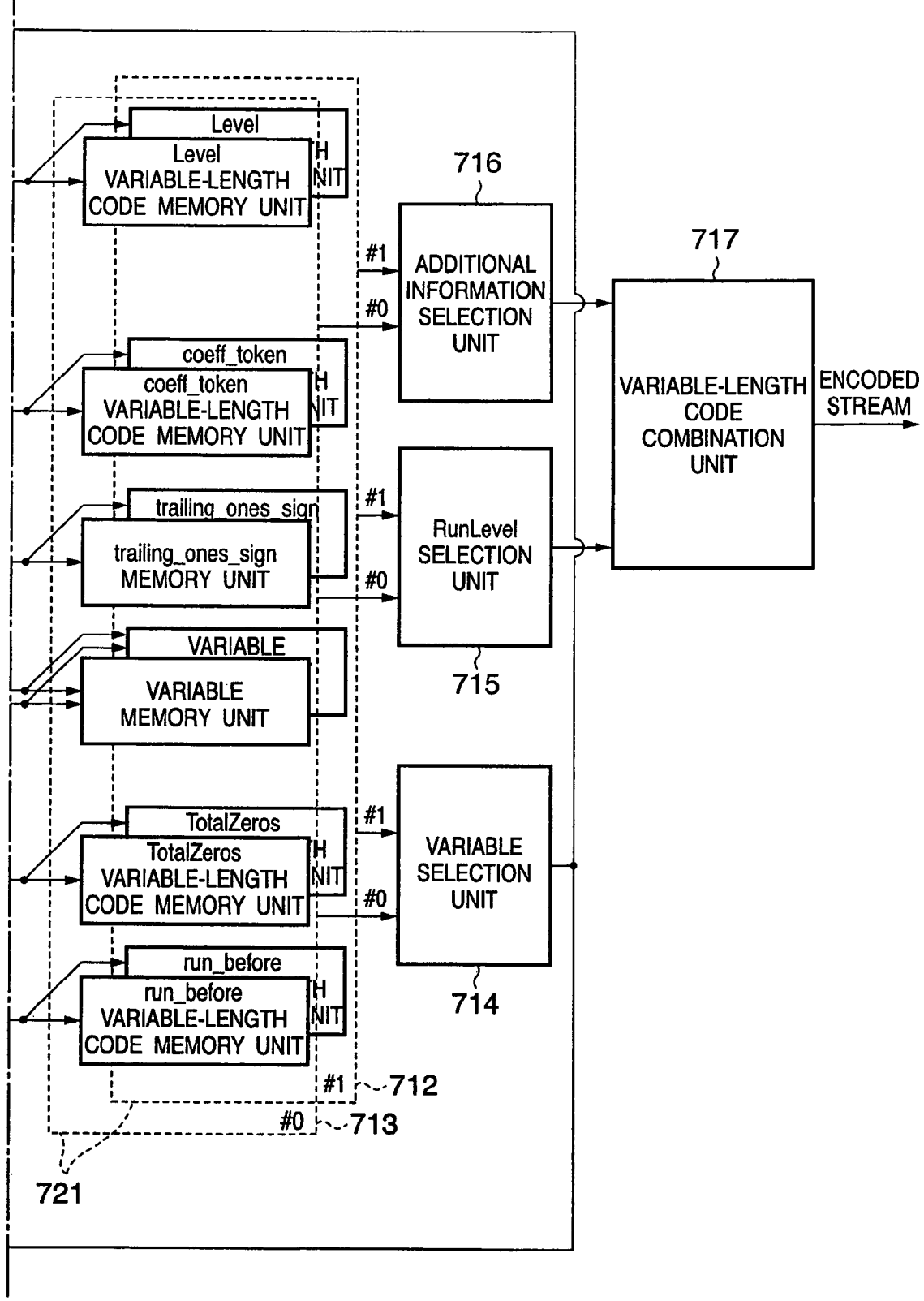

FIGS. 7A and 7B are block diagrams of an entropy encoding apparatus according to the first embodiment.

Figures 2A, 2B:
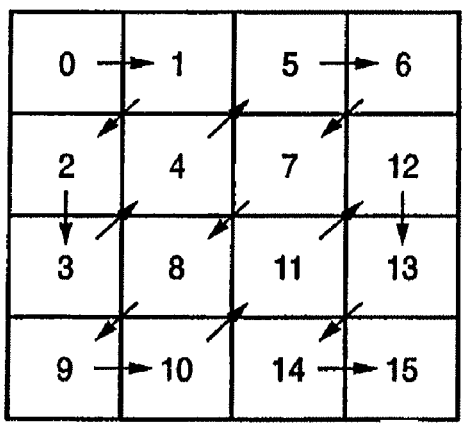
FIGS. 2A and 2B are views for explaining a scan order.
Figure 3:
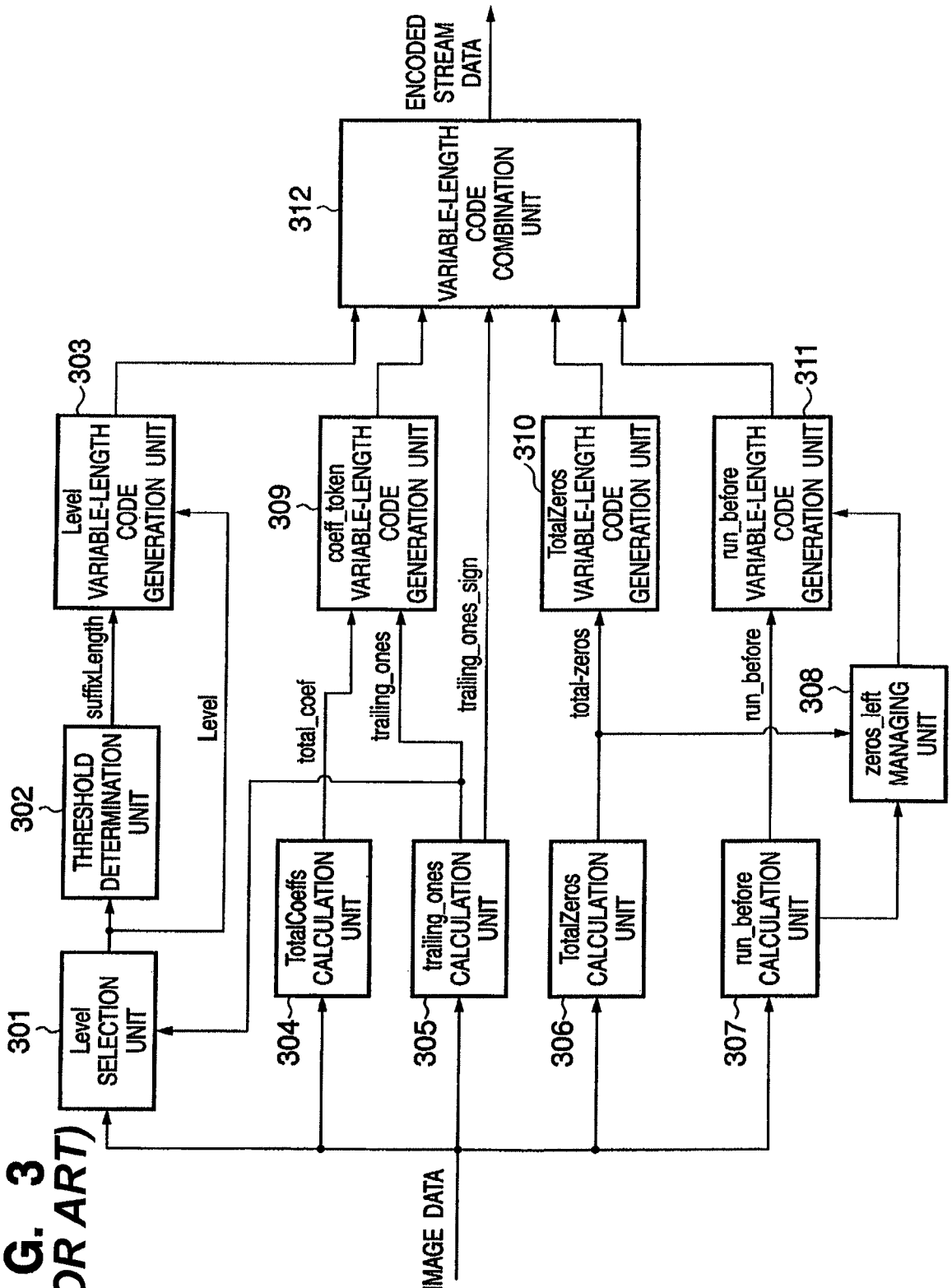
FIG. 3 is a block diagram showing processing in an entropy encoding scheme in the H. 264 encoding scheme.
Figure 5A:
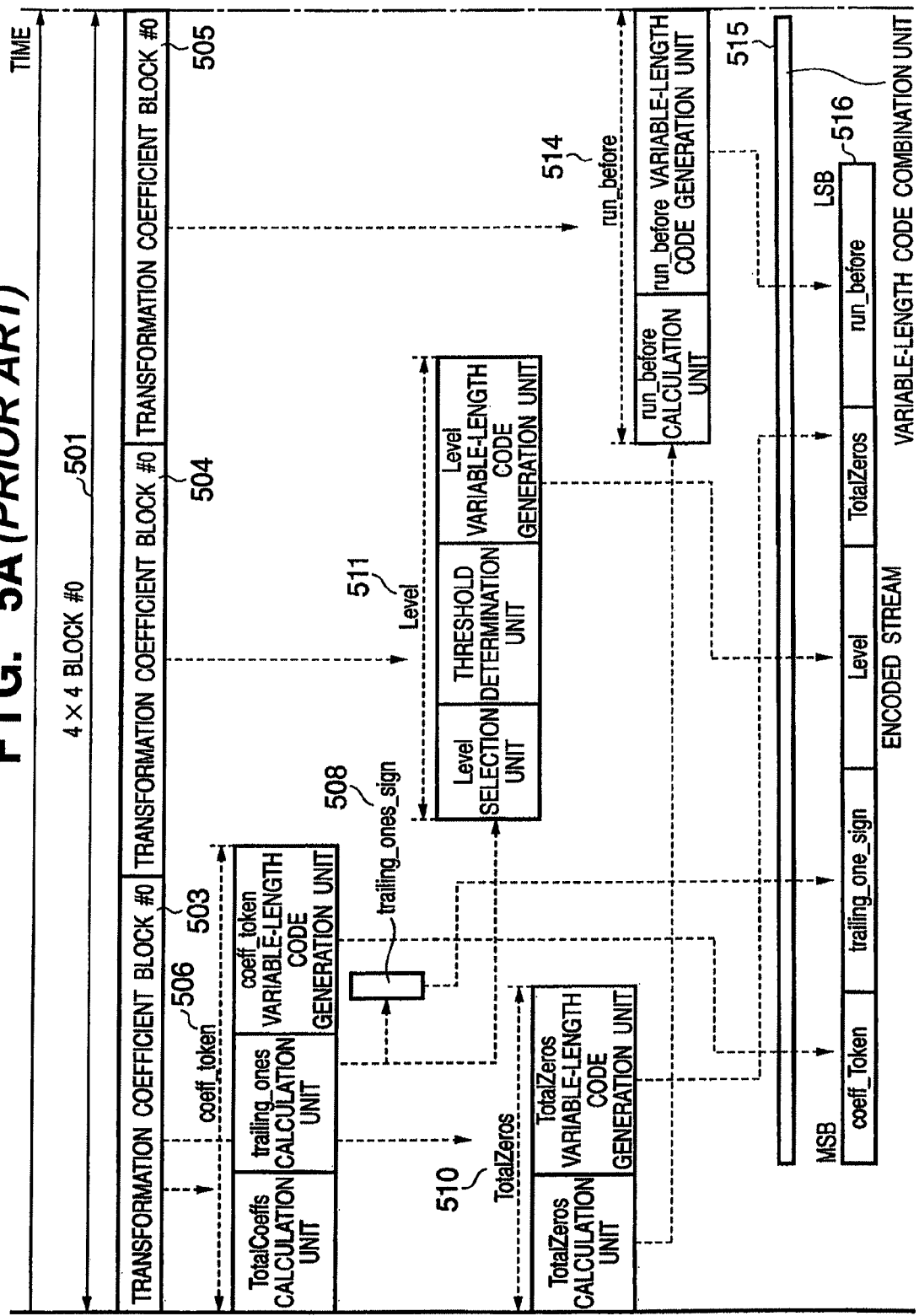
FIGS. 5A and 5B are views showing the relationship between each process in the conventional entropy encoding scheme and time.
Figure 5B:
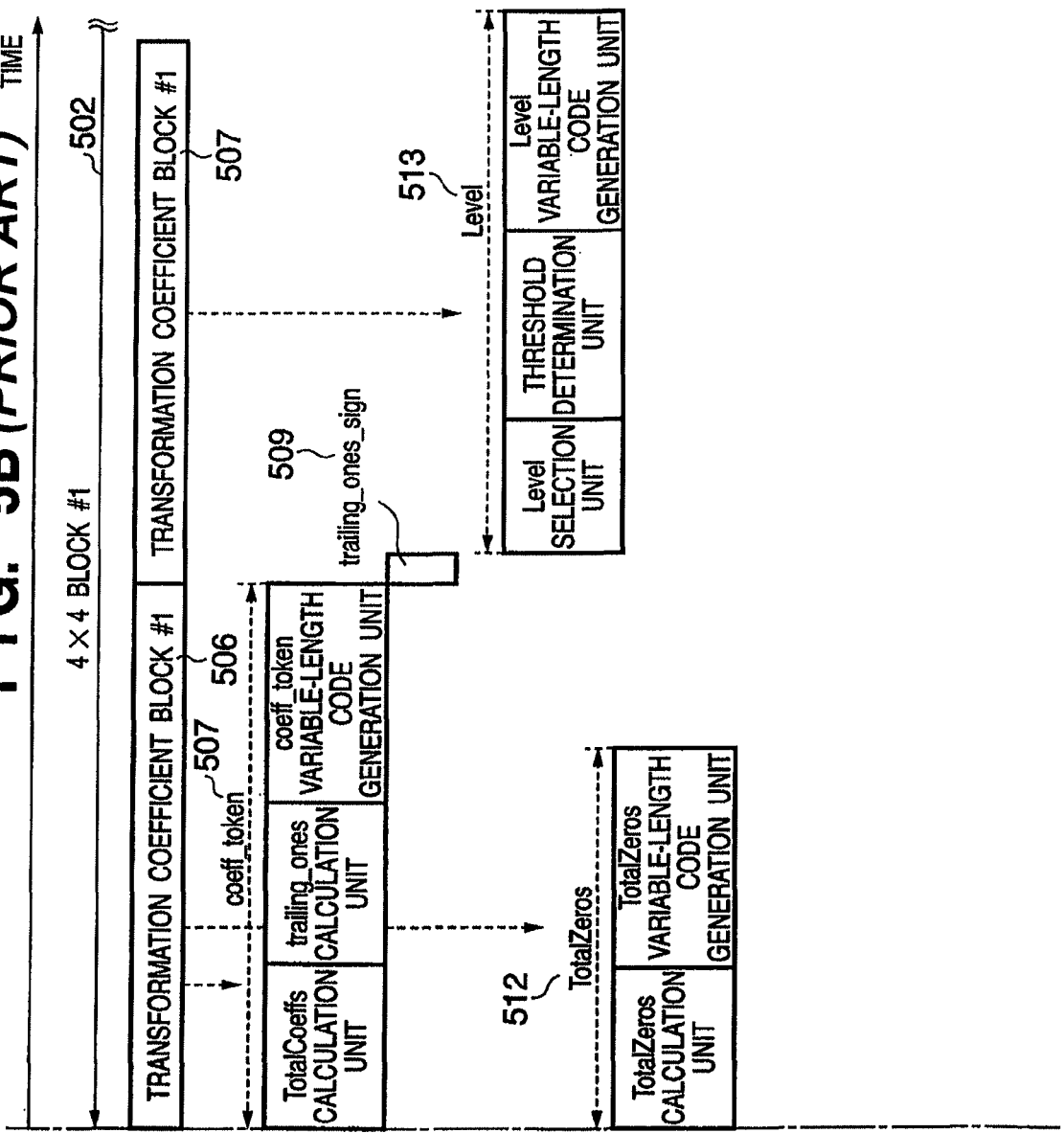

Image data input to this variable-length encoding apparatus are the transformation coefficients shown in FIG. 2A which have undergone orthogonal transformation and quantization processing. The transformation coefficients are input from a block (not shown) designed to perform quantization processing for each 4×4 block shown in FIG. 2A in the raster scan order.

The input transformation coefficients of the 4×4 block are sequentially stored in the block memory units, and at the same time are input to a TotalCoeffs calculation unit 704, trailing_ones calculation unit 706, and TotalZeros calculation unit 707. A block memory unit 720 is comprised of block memory units 718 and 719 which are two block memory units each having a capacity large enough to store the transformation coefficients of a 4×4 block.

The two block memory units 718 and 719 operate as alternate buffers on a 4×4 block basis. That is, target memory units in which input transformation coefficients are to be written are switched on a 4×4 block basis.

On the other hand, the TotalCoeffs calculation unit 704, trailing_ones calculation unit 706, and TotalZeros calculation unit 707 receive transformation coefficients input to this variable-length encoding apparatus, and respectively output syntax elements TotalCoeffs, trailing_ones, trailing_ones_sign, and TotalZeros by using a technique similar to the processing in [Entropy Encoding Processing in H. 264 Encoding Scheme].

TotalCoeffs and trailing_ones are input to a Coeff_token variable-length code generation unit 705, which in turn outputs a variable-length code corresponding to the value of coeff_token calculated from these two syntax elements. Likewise, a TotalZeros variable-length code generation unit 709 outputs a variable-length code corresponding to the value of TotalZeros input thereto.

A variable-length code corresponding to each syntax element is stored in a variable-length code memory unit group 721. The variable-length code memory unit group 721 is comprised of variable-length code memory unit groups 712 and 713, which are two memory units each having a capacity large enough to store the maximum amount of codes generated on a 4×4 block basis. The variable-length code memory unit groups 712 and 713 operate as alternate buffers for each syntax element on a 4×4 block basis.

The values of trailing_ones and TotalZeros which are required to generate syntax elements Level and run_before are stored in variable memory units in the variable-length code memory unit group 721.

Transformation coefficients stored in the block memory unit 720 are input to a Level selection unit 701 and a run_before calculation unit 708 by reading them out on a 4×4 block basis in the reverse scan order. One of the block memory units 718 and 719 in the block memory unit 720 in which transformation coefficients input to this variable-length encoding apparatus are not written is selected, and read operation is performed. The operations of the Level selection unit 701, a threshold determination unit 702, and a Level variable-length code generation unit 703 are the same as those in entropy encoding processing in the H. 264 encoding scheme described above.

The number of variable-length codes output from the Level variable-length code generation unit 703 on a 4×4 block basis varies depending on the number of significant coefficients in each 4×4 block. The Level variable-length code memory unit 712 or 713 in the variable-length code memory unit group 721 combines variable-length codes input from the Level variable-length code generation unit 703 into one codeword stream on a 4×4 block basis and stores it.

The operations of the run_before calculation unit 708, a zeros_left managing unit 711, and a run_before variable-length code generation unit 710 are the same as those in entropy encoding processing in the H. 264 encoding scheme described above.

The number of variable-length codes to be output from the run_before variable-length code generation unit 710 on a 4×4 block basis varies in accordance with the number of significant coefficients in each 4×4 block. The run_before variable-length code memory unit in the variable-length code memory unit group 721 combines variable-length codes input from the run_before variable-length code generation unit 710 into one codeword stream on a 4×4 block basis and stores it.

The variable-length code memory unit group 721 is comprised of a Level variable-length code memory unit which stores a variable-length code corresponding to each syntax element, a coeff_token variable-length code memory unit, a trailing_ones_sign memory unit, a TotalZeros variable-length code memory unit, a run_before variable-length code memory unit, and a variable memory unit which stores variables necessary for the generation of syntax elements. Of these memory units, the Level variable-length code memory unit and the run_before variable-length code memory unit each store input variable-length codes as one codeword stream by combining them as needed because the number of input variable-length codes varies on a 4×4 block basis.

Each of the six memory units in the variable-length code memory unit group 721 is comprised of two memory units which independently perform alternate operation (alternate switching operation) on a block basis. At this time, write operation and read operation in the block memory unit group and variable-length code memory unit group are performed in parallel on a block basis. It suffices if alternate operation is performed on an n block basis (n is an integer equal to or more than one).

An additional information selection unit 716 receives a pair of variable-length codes from each of the coeff_token variable-length code memory unit, trailing_ones_sign memory unit, and TotalZeros variable-length code memory unit in the variable-length code memory unit group 721. The additional information selection unit 716 selects either of each pair by switching for each 4×4 block and outputs it to a variable-length code combination unit 717. Obviously, in the output from the additional information selection unit 716, variable-length codes corresponding to the respective syntax elements are independent of each other and have not been combined into one encoded stream.

A RunLevel selection unit 715 receives a pair of variable-length codes from each of the Level variable-length code memory unit and run_before variable-length code memory unit in the variable-length code memory unit group 721. Like the additional information selection unit 716, the RunLevel selection unit 715 selects either of each pair by switching for each 4×4 block and supplies it to the variable-length code combination unit 717.

The arrangement of a variable selection unit 714 is the same as that of the additional information selection unit 716 and RunLevel selection unit 715 except that the variable selection unit 714 receives data from the variable-length memory units in the variable-length code memory unit group 721. Note, however, that an output from the variable selection unit 714 is supplied to the Level selection unit 701 and the zeros_left managing unit 711 instead of the variable-length code combination unit 717.

The variable-length code combination unit 717 generates an encoded stream by sequentially combining variable-length codes corresponding to the respective syntax elements which are input from the additional information selection unit 716 and the RunLevel selection unit 715.

<Specific Example of Pipeline Operation>

Figure 8B:
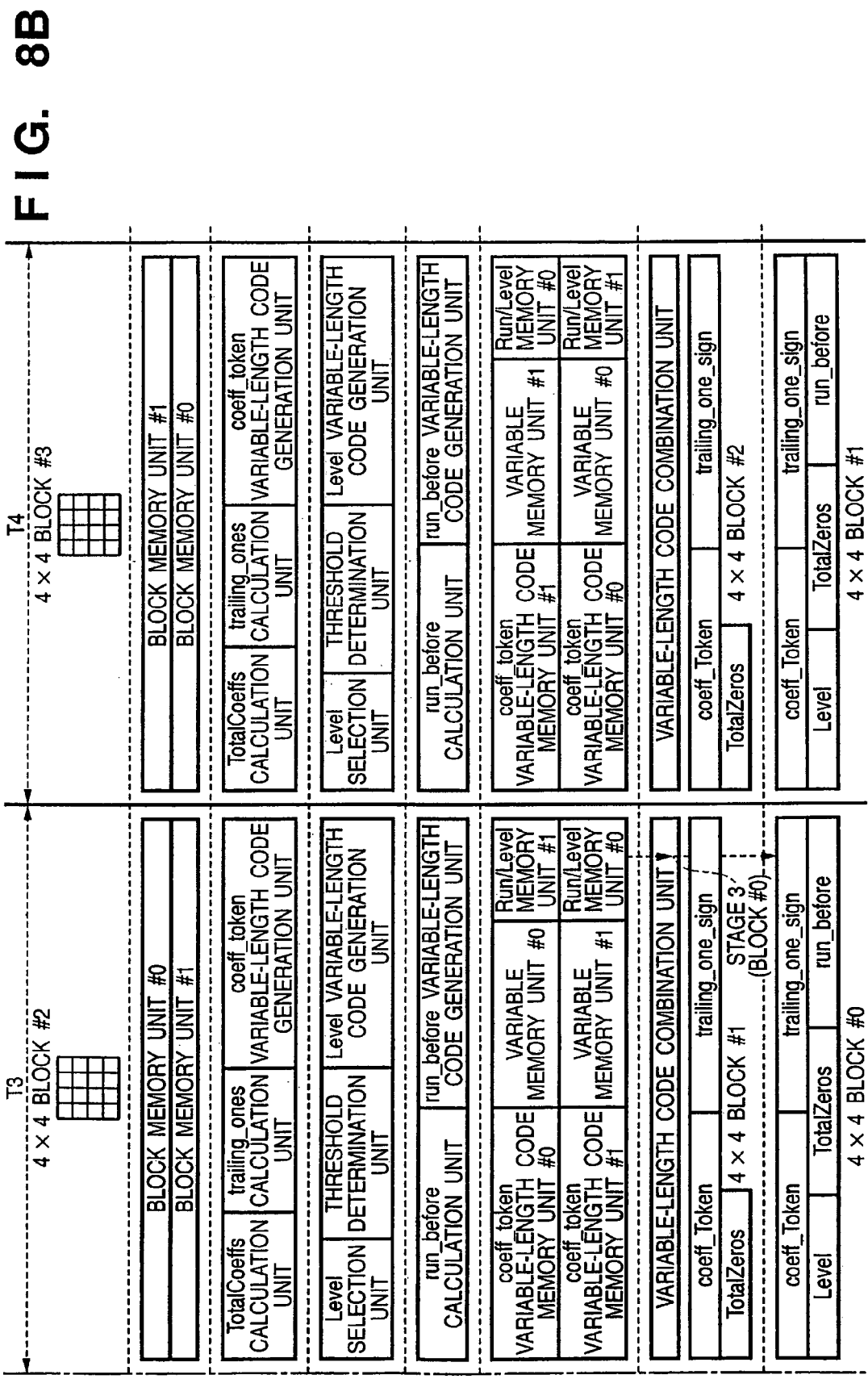

FIGS. 8A and 8B are views showing pipeline operation comprising three stages on a block basis in this variable-length encoding apparatus. FIGS. 8A and 8B show operation divided into divisions in intervals T1 to T4 on a block basis in a case wherein four 4×4 blocks are sequentially input. The following description will be mainly focused on three stages targeted for 4×4 block #0.

(1) Stage 1

In the interval T1, first 4×4 block #0 is input to this variable-length encoding apparatus. The respective transformation coefficients in 4×4 block #0 are sequentially written in block memory unit #0 (corresponding to the block memory unit 718 in FIG. 7A) as indicated by block processing in FIG. 8A, and additional information processing is performed in parallel. The resultant data is then stored in the variable-length code memory unit group 721. In this case, additional information processing corresponds to the TotalCoeffs calculation unit 704, trailing_ones calculation unit 706, Coeff_token variable-length code generation unit 705, TotalZeros calculation unit 707, and TotalZeros variable-length code generation unit in FIG. 7A. Assume that in additional information processing in FIG. 8A, processing is performed in parallel in the TotalZeros calculation unit 707 and the TotalZeros variable-length code generation unit, although not shown in FIG. 8A.

Variable-length codes corresponding to coeff_token, TotalZeros, and trailing_ones_sign which are obtained as a result of additional information processing are stored in corresponding memory units #0 in the variable-length code memory unit group. Likewise, the values of TotalZeros and trailing_ones are stored in corresponding memory units #0 in the variable-length code memory unit group.

(2) Stage 2

In the interval T2, transformation coefficients are read out from block memory units #0 in which 4×4 block #0 is stored, and Level processing and run_before processing are performed. Level processing corresponds to three processes in the Level selection unit 701, threshold determination unit 702, and Level variable-length code generation unit 703, and run_before processing corresponds to the run_before calculation unit 708, zeros_left managing unit 711, and run_before variable-length code generation unit 710. The variable-length codes obtained as a result of Level processing and run_before processing are stored in corresponding memory units #0 in the variable-length code memory unit group.

In parallel with these processes, the variable-length code combination unit 717 reads out variable-length codes corresponding to coeff_token and TotalZeros which are written in memory units #0 in the variable-length code memory unit group in stage 1, and combines them. The variable-length code combination unit 717 holds the resultant data, and independently holds trailing_ones_sign.

Next 4×4 block #1 is input in parallel to this variable-length encoding apparatus, and processing in stage 1 is performed. In this case, the 4×4 block is written in block memory unit #1 (corresponding to the block memory unit 719 in FIG. 7A), and an additional information processing result is stored in memory unit #1 in the variable-length code memory unit group.

(3) Stage 3

In the interval T3, the variable-length code combination unit 717 reads out the variable-length codes stored in stage 2 as the results of Level processing and run_before processing from corresponding memory units #0 in the variable-length code memory unit group, combines them with the variable-length code obtained by combining coeff_token and TotalZeros and the code corresponding to trailing_ones_sign, held in the variable-length code combination unit 717 in stage 2, and outputs the resultant data as an encoded stream.

The variable-length encoding apparatus which variable-length-encodes a plurality of syntax elements on a block basis and outputs the resultant data as one encoded stream can realize pipeline operation on a block basis and can perform high-speed variable-length encoding by using two block memory units on the input stage, which alternately operate on a block basis, and two variable-length code memory units which alternately operation on a block basis for variable-length codes corresponding to the respective syntax elements.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-347238 filed Nov. 30, 2004, which is hereby incorporated by reference herein.

What is claimed is:

1. A variable-length encoding apparatus which receives image data on a block basis, generates syntax elements from the image data, and outputs an encoded stream by performing variable-length encoding of the syntax elements, comprising:
a block memory unit group including a plurality of block memory units which store the image data on a block basis;
a syntax element generation unit group including a plurality of syntax element generation units which read out image data from said block memory units and generate syntax elements;
a variable-length encoding unit group including a plurality of variable-length encoding units which independently variable-length-encode syntax elements input from said syntax element generation unit group and output variable-length codewords;
a variable-length code memory unit group including a plurality of variable-length code memory units which independently store the variable-length codewords supplied from said variable-length encoding unit group as codeword streams; and
a variable-length code combination unit which generates an encoded stream by combining a plurality of codeword streams supplied from said variable-length code memory unit group for each syntax element independently, wherein the codeword streams of at least two types of syntax elements are combined.

2. The apparatus according to claim 1, wherein said block memory unit group and said variable-length code memory unit group alternately perform write operation and read operation on an n block basis, n is an integer not less than one, so as to perform write operation and read operation in parallel.

3. The apparatus according to claim 1, wherein said block memory unit group and said variable-length code memory unit group serve as boundaries of stages in pipeline operation.

4. The apparatus according to claim 1, wherein said syntax element generation unit group generates a run and/or a level.

5. The apparatus according to claim 2, wherein read operation from said variable-length code memory unit group is executed for each type of code stored in said variable-length code memory unit group.

6. A variable-length encoding method of receiving image data on a block basis, generating syntax elements from the image data, and outputting an encoded stream by performing variable-length encoding of the syntax elements, comprising:

storing the image data in a block memory unit group including a plurality of block memory units on a block basis;

generating syntax elements in a plurality of syntax element generation units by reading out image data from the block memory units;

variable-length-encoding the generated syntax elements independently for each syntax element in a plurality of variable-length encoding units and outputting a variable-length codewords;

storing the output variable-length codewords independently as codeword streams in a plurality of variable-length code memory units included in a variable-length code memory unit group; and generating an encoded stream by combining a plurality of codeword streams supplied from the variable-length code memory unit group for each syntax element independently, wherein the codeword streams of at least two types of syntax elements are combined.

7. The method according to claim 6, wherein write operation and read operation in the block memory unit group and the variable-length code memory unit group are performed on a block basis.

8. The method according to claim 6, wherein the block memory unit group and the variable-length code memory unit group serve as boundaries of stages in pipeline operation.

9. The method according to claim 6, wherein in the step of generating syntax elements, a run and/or a level is generated.

10. The method according to claim 7, wherein read operation from the variable-length code memory unit group is executed for each type of code stored in the variable-length code memory unit group.

* * * * *